(12) United States Patent
Lee et al.

(10) Patent No.: US 11,276,899 B2
(45) Date of Patent: Mar. 15, 2022

(54) RECHARGEABLE BATTERY

(71) Applicant: Samsung SDI Co., Ltd., Yongin-si (KR)

(72) Inventors: Chiyoung Lee, Yongin-si (KR); Sangwon Byun, Yongin-si (KR); Myungjae Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 37 days.

(21) Appl. No.: 16/335,463

(22) PCT Filed: Sep. 13, 2017

(86) PCT No.: PCT/KR2017/010043
§ 371 (c)(1),
(2) Date: Mar. 21, 2019

(87) PCT Pub. No.: WO2018/056630
PCT Pub. Date: Mar. 29, 2018

(65) Prior Publication Data
US 2019/0221804 A1 Jul. 18, 2019

(30) Foreign Application Priority Data

Sep. 21, 2016 (KR) .................. 10-2016-0120644

(51) Int. Cl.
*H01M 50/30* (2021.01)
*H01M 10/0525* (2010.01)
(Continued)

(52) U.S. Cl.
CPC .......... *H01M 50/30* (2021.01); *H01M 10/04* (2013.01); *H01M 10/0525* (2013.01); *H01M 10/0587* (2013.01); *H01M 50/3425* (2021.01)

(58) Field of Classification Search
CPC .......... H01M 2/12–1294; H01M 10/05–0587; H01M 50/10–105; H01M 50/147–171; H01M 50/30–37; H01M 10/04–049
See application file for complete search history.

(56) References Cited

U.S. PATENT DOCUMENTS

| | | | | |
|---|---|---|---|---|
| 4,745,039 A | * | 5/1988 | Yoshinaka | H01M 50/325 429/54 |
| 2006/0093896 A1 | * | 5/2006 | Hong | H01M 10/42 429/61 |

(Continued)

FOREIGN PATENT DOCUMENTS

| | | |
|---|---|---|
| CN | 101212033 A | 7/2008 |
| CN | 103597630 A | 2/2014 |

(Continued)

OTHER PUBLICATIONS

Machine translation of Yoshida JP 06-260161, originally published Sep. 16, 1994. (Year: 1994).*

(Continued)

*Primary Examiner* — Jonathan Crepeau
*Assistant Examiner* — Jacob Buchanan
(74) *Attorney, Agent, or Firm* — Lewis Roca Rothgerber Christie LLP

(57) ABSTRACT

A rechargeable battery according to an exemplary embodiment of the present invention includes: an electrode assembly including a first electrode, a separator, and a second electrode; a case that accommodates the electrode assembly, and of which one side through which the electrode assembly is inserted is opened; a cap assembly provided in the opening of the case by being fixed thereto; a vent hole that is formed in a bottom plate of the case, and of which side walls are (Continued)

multi-stepped; and a vent member provided in the vent, wherein a depth of the vent is greater than a thickness of the bottom plate.

12 Claims, 5 Drawing Sheets

(51) Int. Cl.
*H01M 10/0587* (2010.01)
*H01M 10/04* (2006.01)
*H01M 50/342* (2021.01)

(56) References Cited

U.S. PATENT DOCUMENTS

| | | | |
|---|---|---|---|
| 2010/0040945 | A1 | 2/2010 | Wang et al. |
| 2011/0206957 | A1 | 8/2011 | Byun |
| 2012/0015219 | A1* | 1/2012 | Wang ............ H01M 2/1241 429/53 |
| 2012/0214029 | A1 | 8/2012 | Lee et al. |
| 2014/0141293 | A1* | 5/2014 | Urano ............ H01M 2/024 429/56 |
| 2014/0308550 | A1 | 10/2014 | Shimizu et al. |
| 2016/0043367 | A1 | 2/2016 | Chun et al. |

FOREIGN PATENT DOCUMENTS

| | | |
|---|---|---|
| CN | 103931020 A | 7/2014 |
| CN | 206098459 U | 4/2017 |
| EP | 2 738 836 A1 | 6/2014 |
| JP | 06260161 A * | 9/1994 .......... H01M 2/1229 |
| JP | 2014-049190 A | 3/2014 |
| JP | 2014-102934 A | 6/2014 |
| JP | 6094166 B2 | 3/2017 |
| KR | 10-2005-0110501 A | 11/2005 |
| KR | 10-2009-0081174 A | 7/2009 |
| KR | 10-2009-0089292 A | 8/2009 |
| KR | 10-2011-0097573 A | 8/2011 |
| KR | 10-2012-0096354 A | 8/2012 |
| KR | 10-1287103 B1 | 7/2013 |
| KR | 10-2016-0019611 A | 2/2016 |

OTHER PUBLICATIONS

Machine Translation of Deng, CN 206098459. Originally published Apr. 12, 2017. (Year: 2017).*
Extended European Search Report for corresponding European Application No. 17853344.4 dated Jan. 16, 2020, 6 pages.
EPO Office Action dated Sep. 28, 2020, issued in corresponding European Patent Application No. 17853344.4 (4 pages).
Office Action in corresponding Chinese Patent Application No. 201780057608.X with English Translation, Chinese Office Action dated Mar. 2, 2021, accompanied with Search Report dated Jan. 27, 2021 (17 pgs.).
China Office Action with English translation for corresponding China Patent Application No. 201780057608.X, China Office Action dated Sep. 17, 2021, and accompanying Search Report dated Sep. 13, 2021 (18 pages.).

* cited by examiner

RECHARGEABLE BATTERY

CROSS-REFERENCE TO RELATED APPLICATION(S)

This application is a National Phase Patent Application of International Patent Application Number PCT/KR2017/010043, filed on Sep. 13, 2017, which claims priority of Korean Patent Application No. 10-2016-0120644, filed Sep. 21, 2016. The entire contents of both of which are incorporated herein by reference.

TECHNICAL FIELD

The present disclosure relates to a rechargeable battery. More particularly, the present invention relates to a rechargeable battery having a safety apparatus.

BACKGROUND ART

A rechargeable battery is a battery that repeatedly performs charging and discharging, differently from a primary battery. A rechargeable battery with small capacity is used in a portable small electronic device such as a mobile phone, a notebook computer, and a camcorder, and a rechargeable battery with large capacity may be used as a motor driving power source for a hybrid vehicle and an electric vehicle.

The rechargeable battery has a structure in which a positive electrode, a separator, a negative electrode, and an electrolyte are accommodated in a case. The case may have various shapes such as an angled shape, a pouch shape, and a circular shape. An electrode assembly is accommodated in the case which is made of a metal material such as aluminum, and then an interior of the electrode assembly is sealed by blocking the interior of the electrode assembly with a cap plate or the like.

In the rechargeable battery in the sealed state, internal pressure of the case may be increased due to an abnormal reaction or external impact and the like. Thus, the rechargeable battery includes a safety device that can prevent explosion of the rechargeable battery by being broken when the internal pressure exceeds a predetermined pressure condition. Such a safety device may be provided below the case, but in this scenario, a thickness of a bottom plate of the case may be increased.

DISCLOSURE

Technical Problem

One aspect of the present invention has been made in an effort to provide a rechargeable battery of which a safety device is provided in a bottom of a case without increasing a thickness or a weight of the case.

Technical Solution

A rechargeable battery according to an exemplary embodiment of the present invention includes: an electrode assembly including a first electrode, a separator, and a second electrode; a case that accommodates the electrode assembly, and of which one side through which the electrode assembly is inserted is opened; a cap assembly provided in the opening of the case by being fixed thereto; a vent hole that is formed in a bottom plate of the case, and of which side walls are multi-stepped; and a vent member provided in the vent, wherein a depth of the vent is greater than a thickness of the bottom plate. An edge of the vent hole may protrude more into the case than an inner surface of the bottom plate.

A corner of the edge, being adjacent to the bottom surface of the case, may be chamfered.

The corner of the edge may be formed inside the case.

The vent hole may include a first hole having a first width, a second hole having a second width that is smaller than the first width, and a third hole having a third width that is smaller than the second width, and a width of the vent hole may be gradually decreased toward the inside of the case.

The third hole may be a through-hole.

The first hole may expose a first stepped portion that is disposed between a side wall of the first hole and a side wall of the second hole, the second hole, and the third hole, and the second hole may expose a second stepped portion disposed between the side wall of the second hole and a side wall of the third hole, and the third hole.

The vent member may be disposed on the first stepped portion and fixed to the side wall of the second hole by welding.

A height of the side wall of the second hole may be equal to or greater than a thickness of an edge of the vent member.

A height of the side wall of the first hole may be equal to or greater than a maximum height of a protrusion of the vent member due to an internal pressure of the case.

The vent member may include a notch that is ruptured when the internal pressure of the case exceeds a predetermined pressure.

A side wall height of the first hole may be higher than a side wall of the second hole, and the side wall height of the second hole may be higher than a side wall height of the third hole.

The electrode assembly may be formed in the shape of a jelly roll.

Advantageous Effects

According to the present exemplary embodiment, a rechargeable battery of which a thickness and a weight of a case are not increased even through a vent member is formed below the case by forming a side wall of the vent hole to be multi-stepped.

MODE FOR INVENTION

Figure 1:
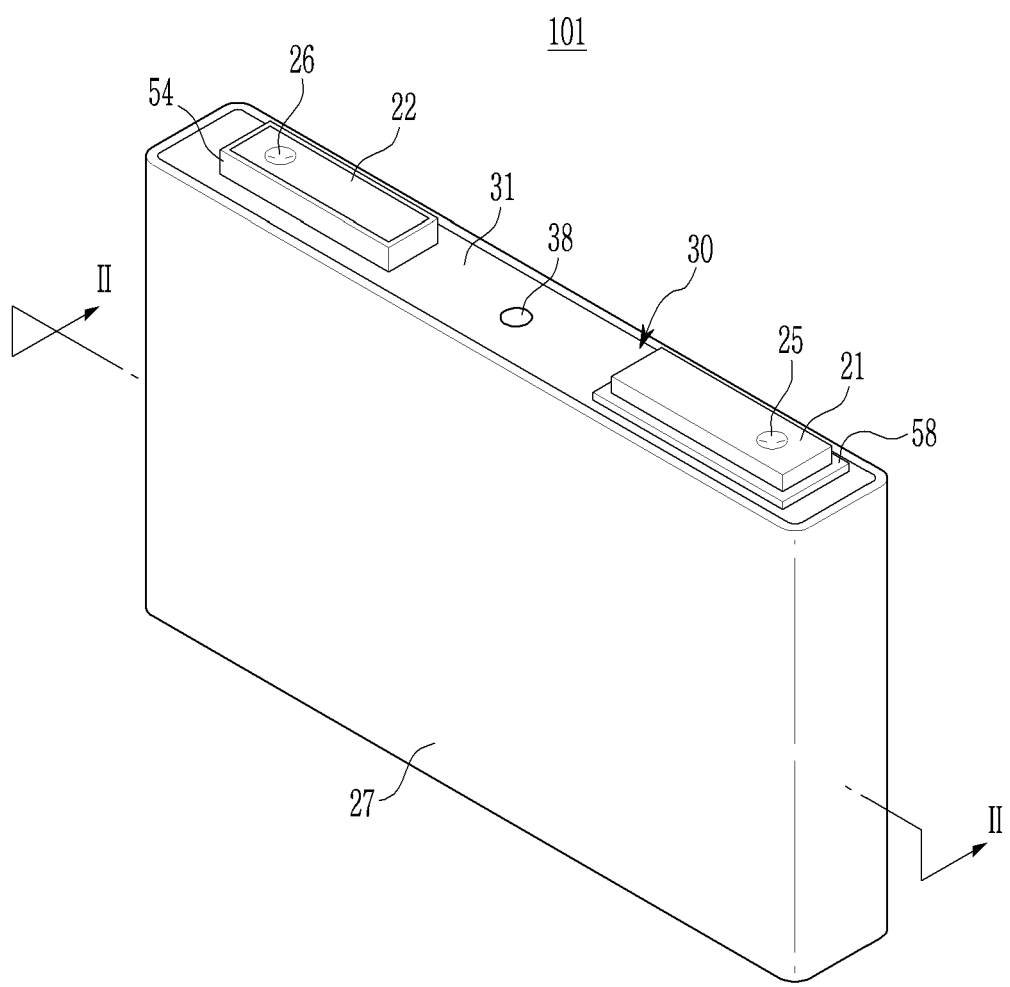
FIG. 1 is a perspective view of a rechargeable battery according to an exemplary embodiment of the present invention.

Hereinafter, the present invention will be described more fully with reference to the accompanying drawings, in which exemplary embodiments of the invention are shown. As those skilled in the art would realize, the described embodiments may be modified in various different ways, all without departing from the scope of the present invention.

The drawings and description are to be regarded as illustrative in nature and not restrictive. Like reference numerals designate like elements throughout the specification. Further, in the drawings, the size and thickness of each element are arbitrarily represented for better understanding and ease of description, but the present invention is not limited thereto.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 2:
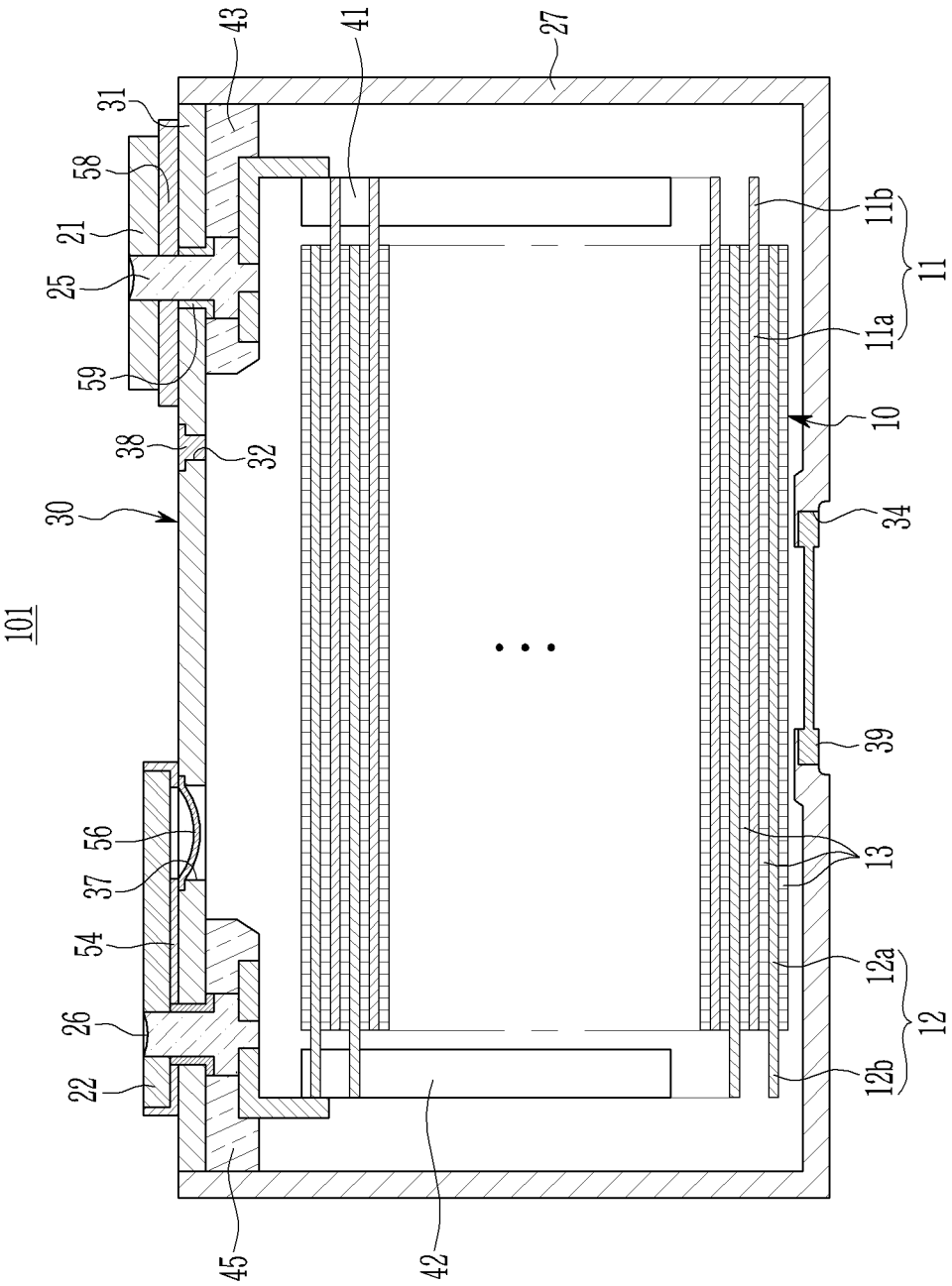
FIG. 2 is a cross-sectional view of FIG. 1, taken along the line II-II.

FIG. 1 is a perspective view of a rechargeable battery according to an exemplary embodiment of the present invention, and FIG. 2 is a cross-sectional view of FIG. 1, taken along the line II-II.

As shown in FIG. 1 and FIG. 2, a rechargeable battery 101 according to an exemplary embodiment of the present invention includes an electrode assembly 10, a case 27 accommodating the electrode assembly 10, and a cap assembly 30 provided in an opening of the case 27.

The rechargeable battery 101 according to the exemplary embodiment of the present invention will be exemplarily described as a prism-shaped lithium ion rechargeable battery. However, the present invention is not limited thereto, and the present invention may be applied to various types of batteries such as a lithium polymer battery or a cylindrical battery.

The electrode assembly 10 may be formed in a shape of a jelly-roll by spirally winding a positive electrode (or a first electrode) 11 and a negative electrode (or a second electrode) 12, while disposing a separator 13 therebetween.

The positive electrode 11 and the negative electrode 12 include electrode active portions 11a and 12a where an active material is coated on a current collector that is formed of a thin metal foil, and electrode uncoated portions 11b and 12b where an active material is not coated. The electrode active portion 11a of the positive electrode 11 may be formed by coating a metal foil such as aluminum with an active material such as a transition metal oxide or the like, and the electrode active portion 12a of the negative electrode 12 may be formed by coating a metal foil such as copper or nickel with an active material such as graphite, carbon, or the like.

The electrode uncoated portion 11b of the positive electrode 11 is formed at one side end of the positive electrode 11 along a length direction of the positive electrode 11, and the electrode uncoated region 12b of the negative electrode 12 is formed at one side end of the negative electrode 12 along a length direction of the negative electrode 12.

In the jelly-roll type of electrode assembly, the electrode uncoated region 11b of the positive electrode 11 and the electrode uncoated region 12b of the negative electrode 11 may be disposed at opposite sides with respect to the electrode active portions 11a and 12a. In addition, the positive electrode 11 and the negative electrode 12 are spirally wound after disposing the separator 13, which is an insulator, therebetween. Further, the separator 13 may be included in plural, and the positive electrode, the negative electrode, and the separator are alternately arranged and then spirally wound. However, the present invention is not limited thereto, and the electrode assembly 10 may have a structure in which a positive electrode, a separator, and a negative electrode, each formed of a plurality of sheets, are iteratively stacked.

The electrode assembly 10 may be accommodated in the case 27, together with an electrolyte solution. The electrolyte solution may be formed of a lithium salt such as $LiPF_6$, $LiBF_4$, and the like in an organic solvent such as EC, PC, DEC, EMC, and DMC. The electrolyte solution may be a liquid, a solid, or gel-like.

The case 27 may be formed of a metal such as aluminum, and may form a substantially rectangular parallelepiped. One side of the case 27 may be opened, and the cap assembly 30 may be provided in the opened side of the case 27.

The cap assembly 30 includes a cap plate 31 that is combined to the case 27 to cover the opening, a positive terminal 21 protruded to the outside the cap plate 21 and electrically connected with the positive electrode 11, and a negative terminal 22 protruded to the outside the cap plate 21 and electrically connected with the negative electrode 12.

The cap plate 31 is formed in the shape of a plate that extends in one direction, and is combined to the opening of the case 27. The cap plate 31 includes an inlet 32 which penetrates through the cap plate 31. The inlet 32 is provided for injection of the electrolyte solution, and a sealing cap 38 is provided thereto.

The positive terminal 21 and the negative terminal 22 protrude upward. The positive terminal 21 is electrically connected with the positive electrode 11 through a current collecting tab 41, and the negative terminal 22 is electrically connected with the negative electrode 12 through a current collecting tab 42.

A terminal connection member 25 that electrically connects the positive terminal 21 and the current collecting tab 41 is provided between the positive terminal 21 and the current collecting tab 41. The terminal connection member 25 is inserted into a hole formed in the positive terminal 21 and an upper end of the terminal connection member 25 is fixed to the positive terminal 21 by welding, and a lower end of the terminal connection member 25 is fixed to the current collecting tab 41 by welding.

A gasket 59 is inserted into the hole through which the terminal connection member 25 penetrates between the terminal connection member 25 and the cap plate 31 for sealing, and a lower insulation member 43 into which a lower portion of the terminal connection member 25 is inserted is provided below the cap plate 31. A connection plate 58 is provided between the positive terminal 21 and the cap plate 31 for electrical connection therebetween. The terminal connection member 25 is fitted into the connection plate 58. Accordingly, the cap plate 31 and the case 27 are charged with the same voltage as positive electrode 11.

A terminal connection member 26 that electrically connects the negative terminal 22 and the current collecting tab 42 is provided between the negative terminal 22 and the current collecting tab 42. The terminal connection member 26 is inserted into a hole formed in the negative terminal 22, and an upper end of the terminal connection member 26 is fixed to the negative terminal 22 by welding and a lower end thereof is fixed to the current collecting tab 42 by welding.

The gasket 59 is inserted into a hole through which the terminal connection member 26 penetrates for sealing between the negative terminal 22 and the cap plate 31 for sealing, and an upper insulation member 54 is provided for insulation between the negative terminal 22 and the cap plate 31. The terminal connection member 26 may be fitted into a hole of the upper insulation member 54, and the upper insulation member 54 may surround an end of the negative terminal 22.

In addition, a lower insulation member 45 is provided below the cap plate 31 to insulate the negative terminal 22 and the current collecting tab 42 in the cap plate 31.

A short-circuit hole 37 is formed in the cap plate 31, and a short-circuit member 56 is provided in the short-circuit hole 37. The short-circuit member 56 includes a curved portion that is curved downwardly into a convex arc shape, and an edge portion that is formed at an outer side of the curved portion and fixed to the cap plate 31. The upper insulation member 54 may have a cut-out portion that overlaps the short-circuit hole 37, and the short-circuit member 56 overlaps the negative terminal 22 exposed through the cut-out portion.

The short-circuit member 56 is electrically connected with the cap plate 31, and is deformed when an internal pressure of the rechargeable battery 101 is increased, thereby causing a short circuit between the positive electrode and the negative electrode. That is, when a gas is generated from inside the rechargeable battery due to an unexpected reaction, the internal pressure of the rechargeable battery is increased. When the internal pressure of the rechargeable battery exceeds a predetermined pressure, the curved portion is deformed to be upwardly convex, and in this case, the negative terminal 22 and the short-circuit member 56 contact each other, thereby causing a short circuit.

In order to facilitate the short circuit between the negative terminal 22 and the short-circuit member 56, the negative terminal 22 may further include at least one protrusion (not shown) that protrudes toward the short-circuit member 56. The protrusion is separated from the short-circuit member 56.

Meanwhile, a vent member 39 is provided on a bottom plate that is disposed at the other side of the case 27.

This will be described in detail with reference to FIG. 3 to FIG. 5.

Figure 3:
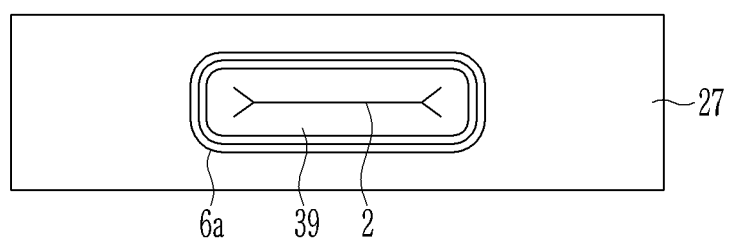
FIG. 3 is a top plan view of a bottom plate of the rechargeable battery of FIG. 1.
Figure 4:
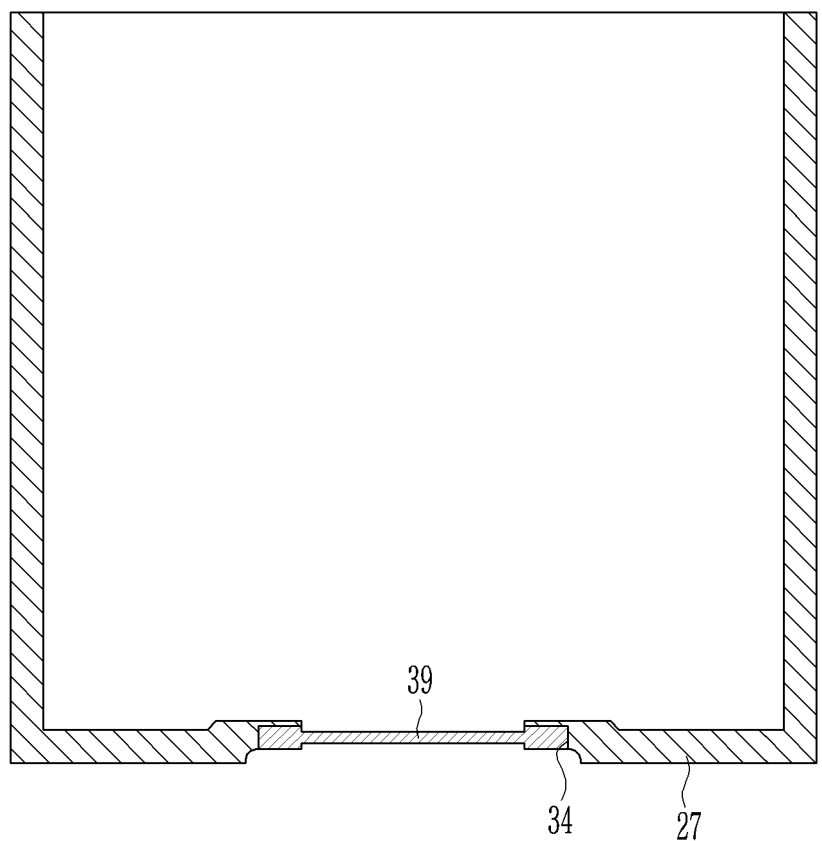
FIG. 4 is a cross-sectional view of a case and a vent member of the rechargeable battery of FIG. 1.
Figure 5:
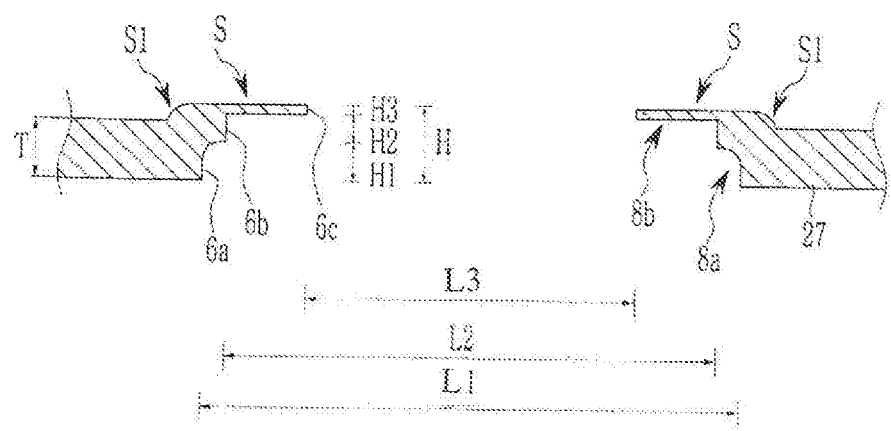
FIG. 5 is a cross-sectional view of a vent hole of the case of the rechargeable battery of FIG. 4.

FIG. 3 is a top plan view of the bottom plate of the rechargeable battery of FIG. 1, FIG. 4 is a cross-sectional view of the case and the vent member of the rechargeable battery of FIG. 1, and FIG. 5 is a cross-sectional view of vent holes of the case of the rechargeable battery of FIG. 4.

As shown in FIG. 3 to FIG. 5, a through-hole may be a vent hole 34 where the vent member 39 is provided. The vent member 39 may include a notch 2 so as to be opened at a predetermined pressure. A portion of the vent member 39 in which the notch 2 is formed may be thinner than a portion of the vent member 39 which contacts the bottom plate of the case such that the vent member 39 can be easily ruptured.

In the vent hole 34, a plurality of holes, each having a different width and a different depth, are continuously connected in a thickness direction of the case 27, and accordingly, side walls of the vent hole 34 may be multi-stepped.

When the respective holes disposed in the inward direction from the outside of the case 27 are referred to as a first hole 6a, a second hole 6b, and a third hole 6c, a first width L1 of the first hole 6a may be larger than a second width L2 of the second hole 6b, and a second width L2 of the second hole 6b may be larger than a third width L3 of the third hole 6c. In addition, a side wall height H1 of the first hole 6a may be higher than a side wall height H2 of the second hole 6b, and the side wall height H2 of the second hole 6b may be higher than a third side wall height H3 of the third hole 6c.

Thus, a first stepped portion 8a is formed between a side wall of the first hole 6a and a side wall of the second hole 6b, and a second stepped portion 8b is formed between the side wall of the second hole 6b and a side wall of the third hole 6c. The first hole 6a exposes the first stepped portion 8a, the second stepped portion 8b, the third hole 6c, and the second hole 6b expose the second stepped portion 8b, and the third hole 6c, and the third hole 6c is a through-hole.

Since the vent member 39 is formed in the second stepped portion 8b, a thickness of the second stepped portion 8b, that is, a thickness of the side wall height of the third hole 6c, preferably has a thickness that can support the vent member 39. For example, the side wall height H3 of the third hole 6c may be about 0.37 mm.

The vent member 39 is disposed to contact the second stepped portion 8b, and an end portion of the vent member 39 may be fixed to the side wall of the second hole 6b by laser welding. Thus, the side wall height of the second hole 6b may be equal to or greater than an edge thickness of the vent member 39. The side wall height of the second hole 6b is smaller than the edge thickness of the vent member 39, and the vent member 39 may protrude to the outside of the first hole 6c or the case 27. For example, when the edge thickness of the vent member 39 is 0.43 mm, the side wall height of the second hole 6b may be greater than 0.43 mm.

An internal pressure of the vent member 39 may be increased due to an abnormal reaction in the vent member 39, and when the internal pressure exceeds a predetermined internal pressure, the vent member 39 is broken. Until the vent member 39 is broken, the vent member 39 can endure the internal pressure, and thus the vent member 39 may protrude while being bent in an outer direction of the case. In this case, when a height of a portion protruded until the vent member 39 is broken due to the internal pressure is high, the vent member 39 protrudes to the outside of the case 27, and thus a gas may not be fluently emitted to the outside even though the vent member 39 is broken. Thus, it is preferred to form the side wall height of the first hole 6a to be high enough even though the vent member 39 is protruded to the maximum to prevent the vent member 39 from protruding to the outside of the case 27. For example, when the maximum height of protruding of the vent member 39 due to the increase of the internal pressure is 0.7 mm, it is preferred that the side wall height of the first hole 6a is 0.7 mm or higher. Meanwhile, an edge S of the vent hole 34 of which the side wall is multi-stepped protrudes farther to the inside of the case 27 than an inner surface of the bottom plate of the case 27. Thus, a depth H of the vent hole 34 may be greater than a thickness T of the case 27.

As described, when the side wall of the vent hole 34 is multi-stepped and the edge of the vent hole 34 protrudes into the case 27, sufficient space where the vent member 39 can be formed can be assured even though the case 27 is formed of a thinner metal plate.

The vent member 39 should not protrude to the outside of the case 27 until the vent member 39 is broken due to the internal pressure. When the vent member 39 is provided in the bottom plate of the case 27, the thickness of the bottom plate of the case 27 should to be increased so as to assure a space for protrusion of the vent member 39.

However, as in the exemplary embodiment, a sufficient space for protrusion of the vent member 39 can be assured by protruding the edge S of the vent hole 34 into the case 27. Then, the vent member can be provided without increasing the thickness of the bottom plate of the case 27. For example, when the depth H of the vent hole 34 for the vent member 39 is 1.5 mm and a thickness T of the bottom plate of the case 27 to be used is 1.2 mm, the edge S of the vent hole 34 may protrude into the case as much as a difference between the depth H of the vent hole 34 and the thickness T of the bottom plate, that is, 0.3 mm.

The case 27 may be formed through a deep drawing process, and in this case, the edge S may protrude into the case 27 by sequentially forming the first hole 6a, the second hole 6b, and the third hole 6c.

A battery assembly where the case 27 is accommodated may be placed in the internally protruded edge S. In this case, a corner Si of the edge S may be chamfered such that the corner Si may be rounded or inclined to thereby prevent the battery assembly from being damaged even when the battery assembly collides with the edge S.

While this invention has been described in connection with what is presently considered to be practical exemplary embodiments, it is to be understood that the invention is not limited to the disclosed embodiments. On the contrary, it is intended to cover various modifications and equivalent arrangements included within the scope of the appended claims.

-Description of symbols-

| | |
|---|---|
| 2: notch | 6a, 6b, 6c: hole |
| 8a, 8b: stepped portion | 10: electrode assembly |
| 11: positive electrode | 11a, 12a: electrode active portion |
| 11a, 11b: electrode uncoated region | |
| 12: negative electrode | 13: separator |
| 21: positive terminal | 22: negative terminal |
| 25, 26: terminal connection member | |
| 27: case | 30: cap assembly |
| 31: cap plate | 32: injection hole |
| 34: vent hole | 27: case |
| 37: short-circuit hole | 38: sealing cap |
| 39: vent member | 41, 42: current collecting tab |
| 43, 45: lower insulation member | |
| 54: upper insulation member | |
| 56: short-circuit member | 58: connection plate |
| 59: gasket | 101: rechargeable battery |

The invention claimed is:

1. A rechargeable battery comprising:
an electrode assembly including a first electrode, a separator, and a second electrode;
a case that accommodates the electrode assembly, and of which one side through which the electrode assembly is inserted comprises an opening;
a cap assembly provided in the opening of the case by being fixed thereto;
a vent hole that is a through-hole formed in a bottom plate of the case, and of which side walls are multi-stepped; and
a vent member provided in the vent hole,
wherein a depth of the vent hole is greater than a thickness of a first region of the bottom plate that is adjacent to the vent hole and outside a perimeter of the vent hole,
wherein a first inner surface defining an edge of a through portion of the vent hole is connected to the first region of the bottom plate through a corner portion,
wherein the vent hole comprises a first hole, a second hole, and a third hole sequentially arranged toward an inside of the case, the first hole being adjacent to the second hole and penetrating an outer surface of the bottom plate, and the third hole being a through-hole through the first inner surface, and
wherein the vent member is located in the second hole and configured to protrude in a direction from the third hole toward the first hole due to an internal pressure of the case, and a height of a side wall of the first hole is less than the thickness of the first region of the bottom plate and is equal to or greater than a maximum height of protrusion of the vent member prior to rupture of the vent member due to the internal pressure of the case.

2. The rechargeable battery of claim 1, wherein the first inner surface protrudes more into the case than an inner surface of the first region of the bottom plate.

3. The rechargeable battery of claim 2, wherein the corner portion is chamfered.

4. The rechargeable battery of claim 3, wherein the corner portion is formed inside the case.

5. The rechargeable battery of claim 1, wherein the first hole has a first width, the second hole has a second width that is smaller than the first width, and the third hole has a third width that is smaller than the second width, and
a width of the vent hole is decreased toward the inside of the case.

6. The rechargeable battery of claim 5, wherein a side wall height of the first hole is higher than a side wall height of the second hole, and the side wall height of the second hole is higher than a side wall height of the third hole.

7. The rechargeable battery of claim 1, wherein the first hole exposes a first stepped portion that is disposed between the side wall of the first hole and a side wall of the second hole, the second hole, and the third hole, and
the second hole exposes a second stepped portion disposed between the side wall of the second hole and a side wall of the third hole, and the third hole.

8. The rechargeable battery of claim 7, wherein the vent member is disposed on the second stepped portion and fixed to the side wall of the second hole by welding.

9. The rechargeable battery of claim 8, wherein a height of the side wall of the second hole is equal to or greater than a thickness of an edge of the vent member.

10. The rechargeable battery of claim 1, wherein the vent member comprises a notch that is ruptured when the internal pressure of the case exceeds a predetermined pressure.

11. The rechargeable battery of claim 1, wherein the electrode assembly has a shape of a jelly roll.

12. The rechargeable battery of claim 1, wherein the first inner surface defining the edge of the through portion of the vent hole is directly connected to the first region of the bottom plate through the corner portion.

* * * * *